United States Patent
Hamperl et al.

(10) Patent No.: US 11,485,362 B2
(45) Date of Patent: Nov. 1, 2022

(54) OPERATING A MOTOR VEHICLE WITH AN ADVANCED MOTOR RESTART OUT OF THE ENGINE-OFF COASTING MODE

(71) Applicant: CPT Group GmbH, Hannover (DE)

(72) Inventors: Helmut Hamperl, Cham (DE); Lisa Wankerl, Wenzenbach (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 427 days.

(21) Appl. No.: 16/472,085

(22) PCT Filed: Dec. 20, 2017

(86) PCT No.: PCT/EP2017/083940
§ 371 (c)(1),
(2) Date: Jun. 20, 2019

(87) PCT Pub. No.: WO2018/115195
PCT Pub. Date: Jun. 28, 2018

(65) Prior Publication Data
US 2020/0094833 A1    Mar. 26, 2020

(30) Foreign Application Priority Data
Dec. 22, 2016 (DE) .................... 10 2016 225 932.6

(51) Int. Cl.
*B60W 30/18* (2012.01)
*B60W 20/20* (2016.01)
(Continued)

(52) U.S. Cl.
CPC ...... *B60W 30/18018* (2013.01); *B60W 20/20* (2013.01); *B60W 30/18072* (2013.01); *F02P 5/145* (2013.01); *F02P 5/142* (2013.01)

(58) Field of Classification Search
CPC .......... B60W 30/18018; B60W 20/20; B60W 30/18072; B60W 2030/1809;
(Continued)

(56) References Cited

U.S. PATENT DOCUMENTS

| 9,333,974 B1 * | 5/2016 | Gibson | ................ B60W 10/06 |
| 2002/0019291 A1 | 2/2002 | Ito | .................................. 477/92 |

(Continued)

FOREIGN PATENT DOCUMENTS

| CN | 104696130 A | 6/2015 | ............. F02N 11/00 |
| DE | 101 37 522 A1 | 6/2002 | ............. B60K 26/00 |

(Continued)

OTHER PUBLICATIONS

German Office Action, Application No. 10 2016 225 932.6, 10 pages, dated Jul. 27, 2017.

(Continued)

*Primary Examiner* — Scott A Reinbold
(74) *Attorney, Agent, or Firm* — Slayden Grubert Beard PLLC

(57) ABSTRACT

Various embodiments include a method for controlling a motor vehicle having an internal combustion engine with a crankshaft and a drivetrain separable from the internal combustion engine using a releasable clutch comprising: propelling the vehicle in a first operating state in a predetermined range around a speed while the internal combustion engine is off and is separated from the drivetrain by the releasable clutch; sensing a braking operation while in the first operating state; predicting whether a power demand is expected within a predetermined time interval; and, if the power demand is expected, setting the crankshaft of the internal combustion engine in rotation, or increasing a rotational speed of the crankshaft in preparation for an engine restart.

10 Claims, 5 Drawing Sheets

(51) Int. Cl.
*F02P 5/145* (2006.01)
*F02P 5/14* (2006.01)

(58) Field of Classification Search
CPC ......... B60W 2520/10; B60W 2540/10; B60W 2540/106; B60W 2540/12; B60W 2540/20; B60W 2710/022; B60W 2710/0644; B60W 2552/20; B60W 2556/50; B60W 50/0097; B60W 10/02; B60W 10/06; B60W 10/08; F02P 5/145; F02P 5/142; Y02T 10/60
See application file for complete search history.

(56) References Cited

U.S. PATENT DOCUMENTS

| | | | | |
|---|---|---|---|---|
| 2002/0103055 A1 | 8/2002 | Tani et al. | ...................... | 477/115 |
| 2004/0138027 A1* | 7/2004 | Rustige | ................. | B60W 10/11 477/175 |
| 2013/0158838 A1* | 6/2013 | Yorke | ................... | B60W 10/06 701/123 |
| 2015/0151761 A1 | 6/2015 | Suzuki et al. | ................. | 701/67 |
| 2016/0264140 A1* | 9/2016 | Matsushita | ........... | B60W 20/40 |
| 2018/0072322 A1* | 3/2018 | Ishiguro | .............. | B60W 30/143 |
| 2019/0093581 A1* | 3/2019 | Vadlamani | ...... | B60W 30/18072 |
| 2019/0211889 A1* | 7/2019 | Reimnitz | ................. | B60K 6/40 |

FOREIGN PATENT DOCUMENTS

| | | | | |
|---|---|---|---|---|
| DE | 102 21 701 A1 | 11/2002 | ............ | B60W 10/02 |
| DE | 602 13 144 T2 | 7/2007 | ............ | B60W 10/02 |
| DE | 11 2013 002 811 T5 | 3/2015 | ............ | B60W 30/18 |
| DE | 10 2014 200 087 A1 | 7/2015 | ............ | B60W 30/18 |
| DE | 10 2016 100 299 A1 | 8/2016 | .......... | B60W 30/192 |
| DE | 10 2015 006 445 A1 | 11/2016 | ............ | B60W 30/14 |
| WO | 2016/152723 A1 | 9/2016 | .......... | B60W 40/068 |
| WO | 2018/115195 A1 | 6/2018 | ............ | B60W 10/02 |

OTHER PUBLICATIONS

International Search Report and Written Opinion, Application No. PCT/EP2017/083940, 23 pages, dated May 2, 2018.
Chinese Office Action, Application No. 201780080265.9, 13 pages, dated Dec. 23, 2021.

* cited by examiner

OPERATING A MOTOR VEHICLE WITH AN ADVANCED MOTOR RESTART OUT OF THE ENGINE-OFF COASTING MODE

CROSS-REFERENCE TO RELATED APPLICATIONS

This application is a U.S. National Stage Application of International Application No. PCT/EP2017/083940 filed Dec. 20, 2017, which designates the United States of America, and claims priority to DE Application No. 10 2016 225 932.6 filed Dec. 22, 2016, the contents of which are hereby incorporated by reference in their entirety.

TECHNICAL FIELD

The present disclosure relates to motor vehicles. Various embodiments may include methods and/or systems for operating a motor vehicle, e.g., an advanced motor restart out of the engine-off coasting mode.

BACKGROUND

In order to save fuel and reduce environmentally harmful emissions, modern vehicles offer the engine-off coasting operating state. Here, the vehicle rolls in a predetermined range around a selected speed while the internal combustion engine is off and is decoupled from the transmission. Here, unless traveling downhill in this state, the vehicle normally slows down. If a lower limit of the speed range is reached, the internal combustion engine is preferably automatically restarted and accelerated again.

In certain situations in this drive operating mode, braking operations are required, in the case of which quick re-acceleration is however desired. Such a situation could be, for example, that a vehicle on the freeway is approaching a slower vehicle traveling in front. If an overtaking maneuver is not presently possible, the driver first has to brake the vehicle and then quickly accelerate again for an overtaking maneuver. The re-acceleration signal is typically triggered by the driver by depressing the accelerator pedal. From the engine-off mode, however, the acceleration performance of the internal combustion engine is only fully accessible when the internal combustion engine has reached its minimum rotational speed. The delay until the engine has reached this minimum rotational speed is usually up to 1500 ms. This delay is often perceived by drivers as unpleasant.

SUMMARY

The teachings of the present disclosure describe methods with which the engine starting time from engine-off coasting can be shortened. For example, some embodiments include a method for operating a motor vehicle having at least one internal combustion engine with a crankshaft, and having a drivetrain which can be separated from the internal combustion engine by means of a releasable clutch, wherein the vehicle is moved in a first possible operating state in a predetermined range around a speed (v) while the internal combustion engine is off and is separated from the drivetrain by the releasable clutch; characterized in that, in the case of a braking operation in this first operating state, a prediction is made as to whether a power demand is to be expected within a predetermined time interval and, if so, the crankshaft of the internal combustion engine is set in rotation, or a rotational speed of the crankshaft is increased, in preparation for an engine restart.

In some embodiments, the prediction as to whether a power demand is to be expected within a predetermined time interval is made on the basis of present state data of the drivetrain and/or driver inputs and/or information items from vehicle sensors and/or route information items.

In some embodiments, the prediction as to whether a power demand is to be expected within a predetermined time interval is negative if at least one predetermined exclusion criterion is present.

In some embodiments, within the predetermined time interval, a power demand is to be expected if a probability, determined on the basis of present state data of the drivetrain and/or information items relating to driver inputs and/or information items from a vehicle sensor arrangement and/or route information items, of a power demand within the predetermined time interval exceeds a predetermined probability threshold.

In some embodiments, the clutch is a friction clutch, and the crankshaft of the internal combustion engine is set in rotation or its rotation speed is increased by virtue of the clutch being at least partially closed in order to transmit a torque from the shaft to the crankshaft by means of friction.

In some embodiments, the crankshaft of the internal combustion engine is set in rotation, or its rotational speed is increased, by means of an electric motor.

In some embodiments, the electric motor is separable from the drivetrain by means of at least one releasable clutch.

As another example, some embodiments include an engine control device with a processor device configured to carry out a method as described above.

In some embodiments, the control device comprises an engine controller for the internal combustion engine and a controller for actuating the clutch.

As another example, some embodiments include a motor vehicle having an internal combustion engine with a crankshaft and having a drivetrain which can be separated from the internal combustion engine by means of a releasable clutch, and having a control device as described above.

BRIEF DESCRIPTION OF THE DRAWINGS

In the following, the teachings herein will be explained in more detail by way of example with reference to the figures. In the figures, in each case schematically.

DETAILED DESCRIPTION

Figure 1:
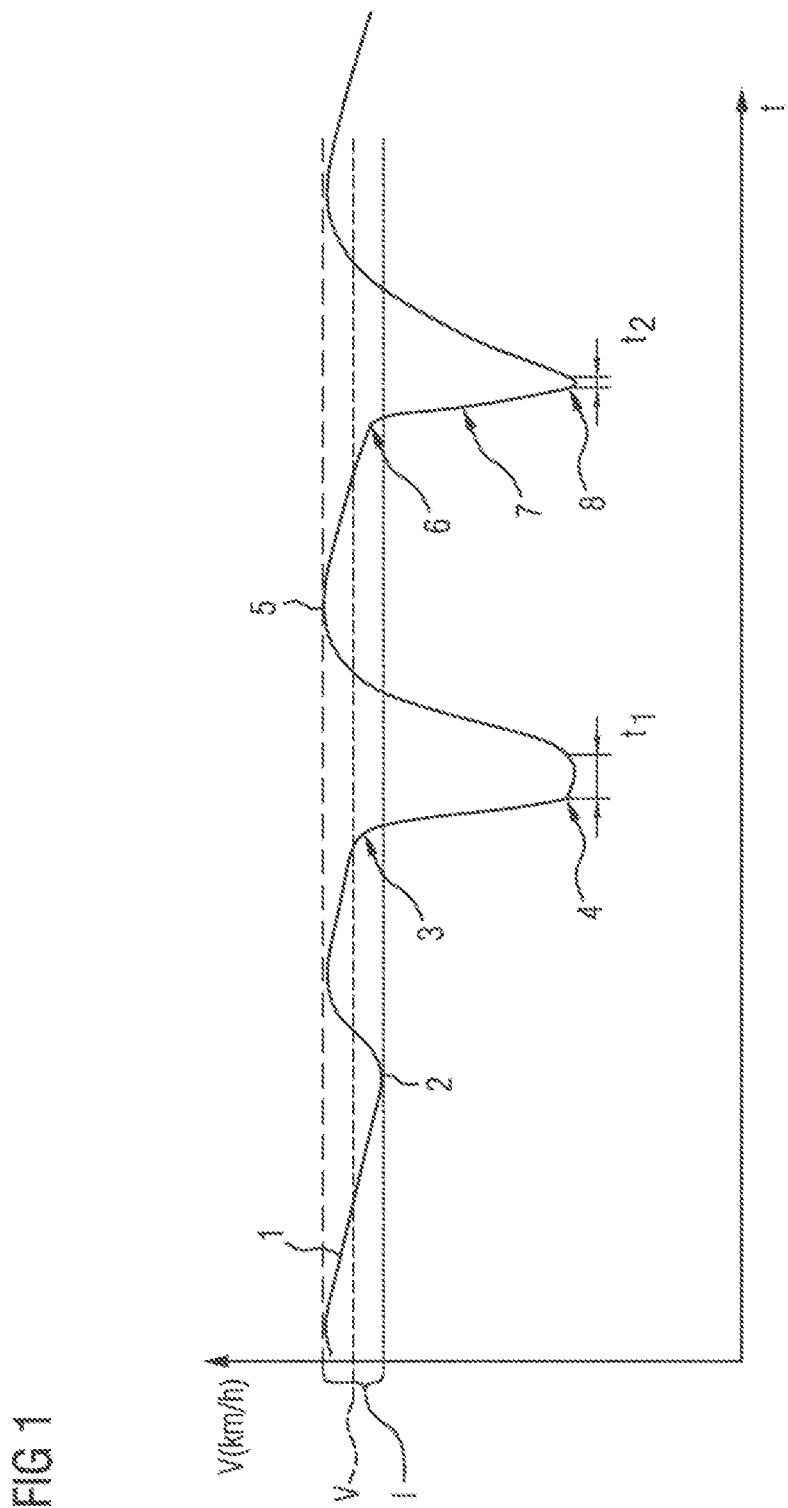
FIG. 1: shows a speed profile of a vehicle in the engine-off coasting operating mode with in each case one braking operation with and without implementation of a method incorporating the teachings herein.

The present disclosure describes methods for operating a motor vehicle, wherein the motor vehicle has at least one internal combustion engine with a crankshaft, and has a drivetrain which can be separated from the internal combustion engine by means of a releasable clutch. The drivetrain has, for example, a transmission and a shaft for transmitting the torque.

In a first possible operating state, the vehicle moves in a predetermined range around a speed v. Here, the internal combustion engine is off and is separated from the drivetrain by the releasable clutch. In some embodiments, in the case of a braking operation in this first possible operating state, a prediction is made as to whether a power demand is to be expected within a predetermined time interval. If a power demand is to be expected within the predetermined time interval, the crankshaft of the internal combustion engine is set in rotation, or the rotational speed of the crankshaft is increased, in preparation for an engine restart.

The methods described herein can be applied in vehicles with a conventional drivetrain with an internal combustion engine, for example with an electric starter or starter-generator, or in hybrid vehicles with a drive electric motor. The first possible operating state of the vehicle corresponds to engine-off coasting. The vehicle moves at a speed in a predetermined range around a selected speed v. The selected speed is not equal to zero and may be greater than a predetermined speed threshold, e.g. greater than 5 km/h or 10 km/h. In particular, however, the state of engine-off coasting is relevant at relatively high speeds on the freeway or on a highway. The predetermined speed range is, for example, an interval with a magnitude of 5 km/h or 10 km/h around the selected speed v and will also be referred to below as the "coasting interval". In the first possible operating state, speed fluctuations of the vehicle within this coasting interval are allowed.

If a braking operation is then performed in this state (for example by actuating the brake pedal), a prediction is made according to the invention as to whether a power demand is to be expected within a predetermined time window. For example, a power demand may be necessary for re-acceleration. The predetermined time window or time interval may not be greater than 10 s, not greater than 5 or 3 seconds, or even less than or equal to 1 second.

If a power demand is to be expected within this time window, that is to say if the prediction is positive, then the crankshaft of the internal combustion engine is set in rotation by way of precaution, or the rotational speed of the crankshaft is increased. In some embodiments, the rotational speed of the crankshaft is increased at least to an idle rotational speed of the internal combustion engine up to the maximum engine rotational speed at maximum power. In some embodiments, this is done already before the driver gives an actual signal for a power demand, e.g. by actuating the accelerator pedal. As a result of this preparatory "spin-up" of the internal combustion engine, the starting time of the internal combustion engine in the event of a power demand by the driver can be considerably reduced (for example by 800 ms).

The prediction as to whether a quick power demand is to be expected after a braking operation may be made on the basis of present state data of the drivetrain and/or information items from a vehicle sensor arrangement and/or driver inputs and/or route information items. In principle, all available information items relating to the state of the vehicle and its surroundings can be utilized for the prediction. Available information items can be obtained from controllers and sensors of the vehicle, by data transmission from the Internet, backend, from infrastructure systems or from other vehicles.

Present state data of the internal combustion engine can be, for example, a vehicle speed, rotational speeds of transmission, electric motor and/or internal combustion engine, and engine temperatures. Driver inputs are, for example, the actuations of the accelerator and/or brake pedal, the force and speed with which the pedals are actuated, or the setting of a turn signal. Information items of a vehicle sensor arrangement are information items from sensors which are situated in the vehicle and which can more closely specify the state of the vehicle. Examples are distance sensors or cameras that can detect, for example, vehicles traveling in front or adjacent vehicles.

Route information items comprise dynamic or static digital maps, for example from a navigation system, in particular if a destination has been entered and a route has been calculated, infrastructure data for example from traffic light or traffic guidance systems, information relating to vehicles traveling in front, traffic information items, information relating to overtaking lanes, terrain information and the like. In particular, in the case of the route information, not only data stored in the vehicle but also data from other sources are of interest.

In certain situations, advanced spinning-up of the internal combustion engine is undesirable. This may for example be an emergency braking operation, wherein the braking operation could be slowed down by the spinning-up of the engine. Therefore, the prediction as to whether a power demand is to be expected within a predetermined time interval may be negative if at least one predetermined exclusion criterion is present. A predetermined exclusion criterion may be that emergency braking is detected or that the vehicle speed is less than or equal to a threshold speed, which may for example be 5 km/h. Emergency braking can be detected on the basis of data of an anti-lock braking system in the vehicle or on the basis of the pressure and speed with which a brake pedal is depressed.

The prediction as to whether a power demand is to be expected within a predetermined time interval may be positive if a probability, calculated on the basis of the aforementioned information, for a power demand within the predetermined time interval exceeds a predefined probability threshold. In some embodiments, no complete calculation of the probability is necessary for the prediction. In some embodiments, certain combinations of individual ones of the aforementioned information items and the absence of exclusion criteria to serve as an indicator of an imminent power demand.

An example of a combination of information items or check criteria on the basis of which the prediction is made is: "Checking whether the lower speed level of the coasting interval has been undershot, checking whether a high braking deceleration is present, such that the lower speed level is reached in less than 500 ms or the rotational speed on the transmission input side of less than 100 rpm is reached, Is a lane change intended? Is a turn signal set? Is it intended to turn off? What is the engine temperature?"

If a power demand is to be expected within the predetermined time interval, then the crankshaft of the internal combustion engine may be set in rotation, or its rotational speed is increased. Depending on the drivetrain architecture, this can be done in different ways. In the case of a P0 or P2 architecture, a clutch is arranged between the internal combustion engine with crankshaft on one side and a transmission and possibly an electric motor on the other side. This means that the internal combustion engine with crankshaft can be separated from the transmission (and possibly the electric motor) and its shafts by means of this clutch. When the clutch is closed, a transmission of torque is possible in both directions.

A friction clutch permits so-called "clutch slipping", in the case of which the clutch is at least partially closed in a defined and controlled process. Here, the rotational speeds of the shafts adjoining on both sides of the clutch are synchronized. In some embodiments, the clutch is a friction clutch and the crankshaft of the internal combustion engine is set in rotation, or its rotational speed is increased, by virtue of the clutch being at least partially closed in order to transmit a torque from the shaft to the crankshaft. In the presence of transmission rotational speeds greater than the idling rotational speeds and less than the maximum rotational speed of the engine, the engine rotational speed can be driven up to the transmission rotational speed by clutch slipping. By means of the spinning-up of the engine from standstill by advanced almost complete clutch engagement, the minimum rotational speed of the engine can be attained. The desired engine rotational speed is then attained by means of targeted injection. The time until the next desired acceleration is shortened by the time for which the engine is engaged in advance by means of the clutch (possibly already during the braking operation) and is spun up to minimum rotational speed (e.g. approx. 300 to 800 ms).

In some embodiments, the crankshaft of the internal combustion engine may be driven by means of an electric motor. The electric motor may be a drive electric motor, such as in a hybrid vehicle, or even a starter or a starter-generator, such as for example in a P1 or P0 architecture. In a P1 or P0 architecture, the electric motor is not directly connected to the drivetrain and the transmission but is rather separable from the drivetrain by means of at least one releasable clutch. By means of the starting of the engine from standstill by means of the starting of the starter or starter-generator, the minimum rotational speed of the engine can be attained. The desired engine rotational speed is then attained by means of targeted injection. The time until the next desired acceleration is shortened by the time for which the engine is started in advance (possibly already during the braking operation) and is spun up to minimum rotational speed (e.g. approx. 250 to 400 ms).

In some embodiments, which the engine is spun up from standstill by means of the starting of the starter with simultaneous relatively high generator power and slightly increased on-board electrical system voltage. The possible time reduction here is for example approx. 300 to 500 ms. The maximum rotational speed to which the internal combustion engine is spun up in preparation may be dependent on the desired braking power and the shortest re-acceleration, but not higher than the rotational speed at maximum power.

In some embodiments, the teachings herein may be carried out as an automatically controlled function of a control device in the vehicle, wherein the control device has a processor device which is configured to carry out an embodiment variant of a method as described above. The control device may include an engine controller for the internal combustion engine and a controller for actuating the clutch. The control device may also have a motor controller for an electric motor.

In FIG. 1, the speed V of a vehicle is plotted against the time t. The vehicle is in the engine-off coasting mode, for example on a freeway. Initially, the vehicle is moving at a speed at the upper edge of an interval I around a selected speed v. In engine-off coasting operating mode, in this case, the internal combustion engine is switched off and the internal combustion engine is separated from the drivetrain by virtue of the clutch being opened. Subsequently, the vehicle travels at decreasing speed until it reaches the lower region of the interval I (coasting interval) at point 2. Here, the internal combustion engine is automatically restarted by a controller and the vehicle is accelerated again until it reaches the upper region of the coasting interval again. The internal combustion engine is switched off again and in normal coasting operation, the process described is repeated.

If, however, intense braking occurs at the time 3, for example because a vehicle traveling in front is moving slower and an overtaking maneuver is not possible, the vehicle departs from the coasting interval I. At the time 4, the driver wishes to overtake, because the overtaking lane is now free, and wishes to accelerate. The internal combustion engine is started. Since the internal combustion engine was off, it takes a period of time $t_1$ until the internal combustion engine can deliver the full acceleration performance. At the time 5, the vehicle again reaches the upper edge of the interval I around the speed v. The engine-off coasting operation can be resumed.

In the following, the described process with implementation of a method incorporating the teachings herein will be presented. Again, proceeding from engine-off coasting operation, intense braking occurs at the time 6. On the basis of a prediction, a high probability of a power demand is detected, and the internal combustion engine is spun up, or its crankshaft is set in rotation or its rotational speed is increased, already during the braking operation 7. At the time 8, the driver outputs a signal for acceleration. The period of time until the internal combustion engine can provide its full acceleration performance is shortened to the period of time $t_2$. The vehicle is accelerated again and can for example resume the engine-off coasting mode again.

Figure 2:
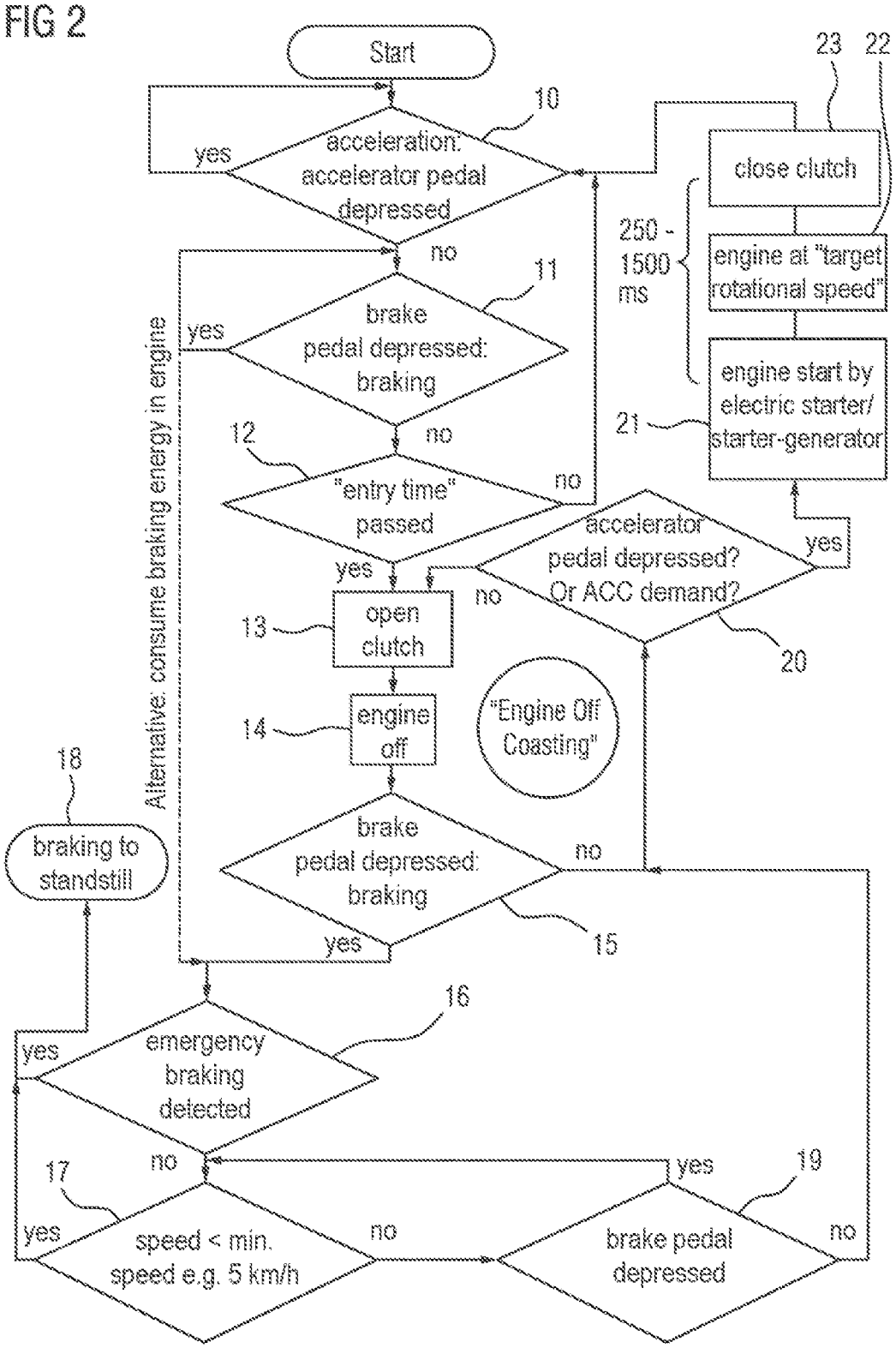
FIG. 2: shows a flow diagram for illustrating the engine-off coasting operating state.

FIG. 2 shows a flow diagram for illustrating the known engine-off coasting according to the prior art. Before entering the engine-off mode, the vehicle must first be accelerated to the desired speed. Therefore, at the start of the flow diagram, the internal combustion engine is on and the clutch is closed. In step ("acceleration/accelerator pedal depressed?"), it is checked whether the accelerator pedal is depressed. Acceleration is continued for as long as the accelerator pedal of the vehicle is depressed in step 10. If the accelerator pedal is not depressed, it is checked in step 11 ("braking/brake pedal depressed?") whether the brake pedal is depressed. If the brake pedal is depressed, the step is repeated. Alternatively, braking energy can be consumed in the engine, and it can subsequently be checked in step 16 ("emergency braking detected?") whether emergency braking is present or whether, in step 17 (speed<min. speed e.g. 5 km/h?"), a low speed, e.g. less than 5 km/h, is detected. If one of the two is present, the vehicle is braked further, possibly to a standstill (step 18, "braking to standstill").

However, if in step 11 the brake pedal is not depressed, then in step 12 ("entry time passed?"), it is queried whether a certain predetermined entry time has expired. This may be predetermined as a requirement for entry into the automatic engine-off mode. If the entry time has not expired, steps 10 and 11 are repeated and it is checked whether the accelerator pedal or the brake pedal are depressed. If neither is the case, and it is determined in step 12 that the entry time has passed, the clutch is opened in step 13 ("open clutch") and the internal combustion engine is switched off in step 14 ("internal combustion engine off"). This starts the actual engine-off mode.

In step 15 ("brake pedal depressed?"), it is checked whether the brake pedal is depressed. If so, it is checked again in step 16 whether an emergency braking operation is present. If the brake pedal is not depressed, it is checked in step 20 ("accelerator pedal depressed or ACC demand?")

whether the accelerator pedal is depressed or whether a power demand is present. In this case, in step 21 ("engine start by electric starter or starter-generator"), the internal combustion engine is started, for example by an electric starter or starter-generator. As soon as it is determined in step 22 ("engine at target rotational speed?") that the internal combustion engine has reached its target rotational speed, the clutch is closed in step 23 ("close clutch"). Subsequently, the method can be repeated with step 10.

However, if neither the brake pedal is depressed in step 15 nor a power demand occurs in step 20, for example by means of the accelerator pedal, the vehicle remains in the engine-off mode with the clutch open (step 13) and the internal combustion engine switched off (step 14) until either an acceleration or a braking demand is made.

Figure 3:
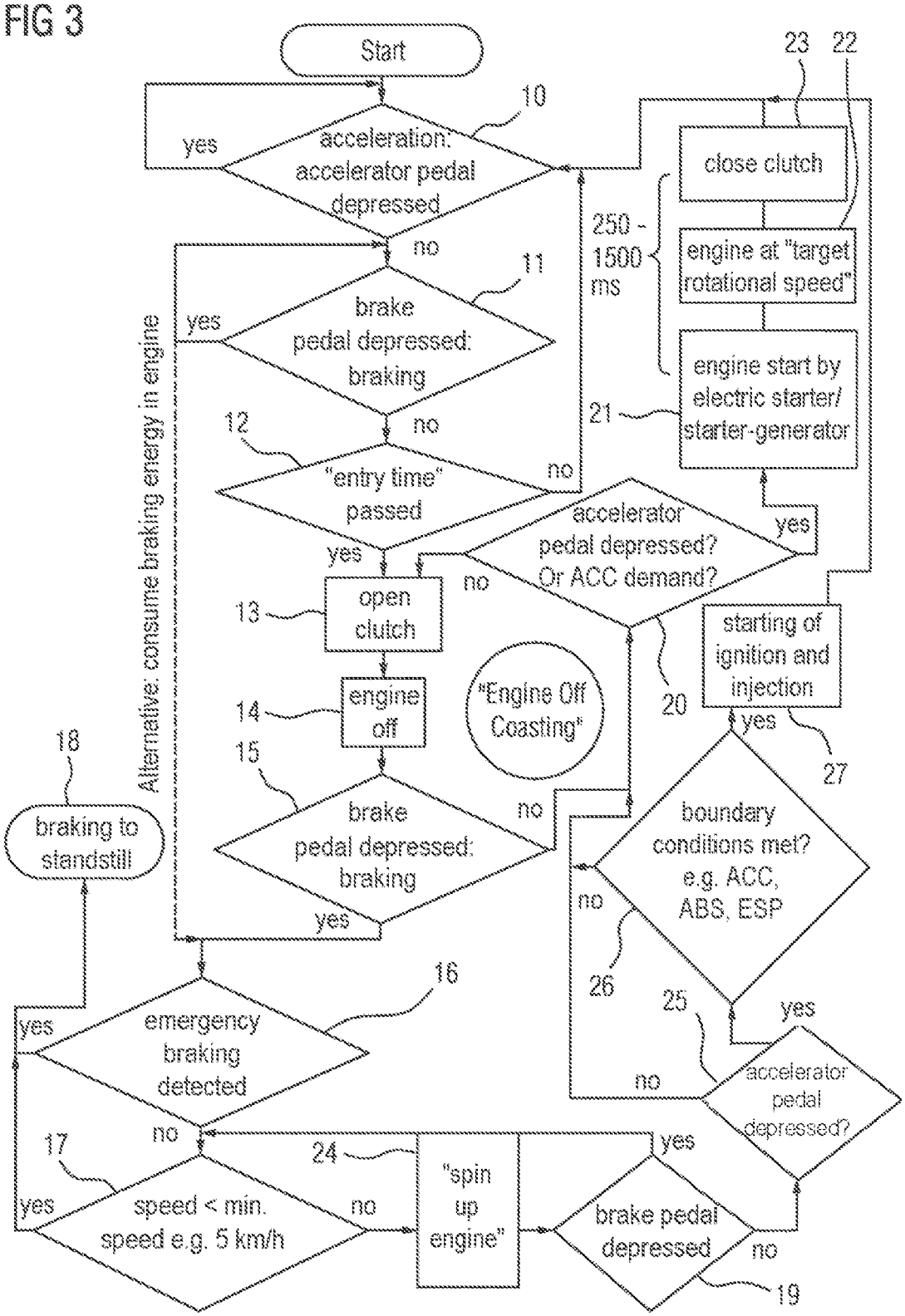
FIG. 3: shows a flow diagram for illustrating the sequence of a method incorporating the present teachings according to an embodiment variant.

FIG. 3 shows, in a flow diagram, the implementation of a method incorporating the teachings herein. The method shown in FIG. 3 likewise starts from the engine-off mode shown in FIG. 2. Therefore, for the same steps, the same reference designations are used, and reference is made to the description relating to FIG. 2. The method starts in step 15, in which the vehicle is already in the engine-off mode and, in step 15, a braking demand is detected. In some embodiments, a prediction is made as to whether a power demand is to be expected within a predetermined time interval. For this purpose, it is checked in step 16 whether emergency braking is present. If so, this is an exclusion criterion, and the method ends. The vehicle can be braked to a standstill entirely normally in step 18. If no emergency braking is detected but a low speed of less than 5 km/h is determined in step 17, the prediction for the probability of a power demand is likewise negative. The method ends, and, in step 18, braking to standstill can likewise be performed.

However, if the prediction yields that a power demand is to be expected, in step 24 ("spin up engine"), the crankshaft of the internal combustion engine is set in rotation or its rotational speed is increased. Depending on the drivetrain architecture, this is realized by means of controlled clutch slippage, in a P0 or P2 architecture, or by means of an electric motor, e.g. a starter-generator, in a P0 or P1 architecture. In the case of controlled clutch slippage, that is to say at least partial closure of the friction clutch, the internal combustion engine can in this way be "spun up" to the transmission rotational speed if the transmission rotational speed is higher than the idle rotational speed of the engine and lower than the internal combustion engine rotational speed at maximum power.

During or after this, in step 19 ("brake pedal depressed?"), it is checked whether the brake pedal is still depressed. If so, it is checked again in step 17 whether a minimum speed of 5 km/h has been undershot. If the brake pedal is no longer depressed in step 19, it is checked in step 25 ("accelerator pedal depressed") whether a power demand is present or whether the accelerator pedal is depressed. If this is not the case, a switch is made back to the engine-off mode. If, however, the accelerator pedal is depressed, in step 26 ("boundary conditions met? ACC, ABS, ESP, . . . "), it is also checked whether further boundary conditions are met, e.g. with regard to ACC, ABS, ESP or others, and finally, in step ("starting of ignition and injection"), the ignition and injection of the internal combustion engine are started.

Figure 4:
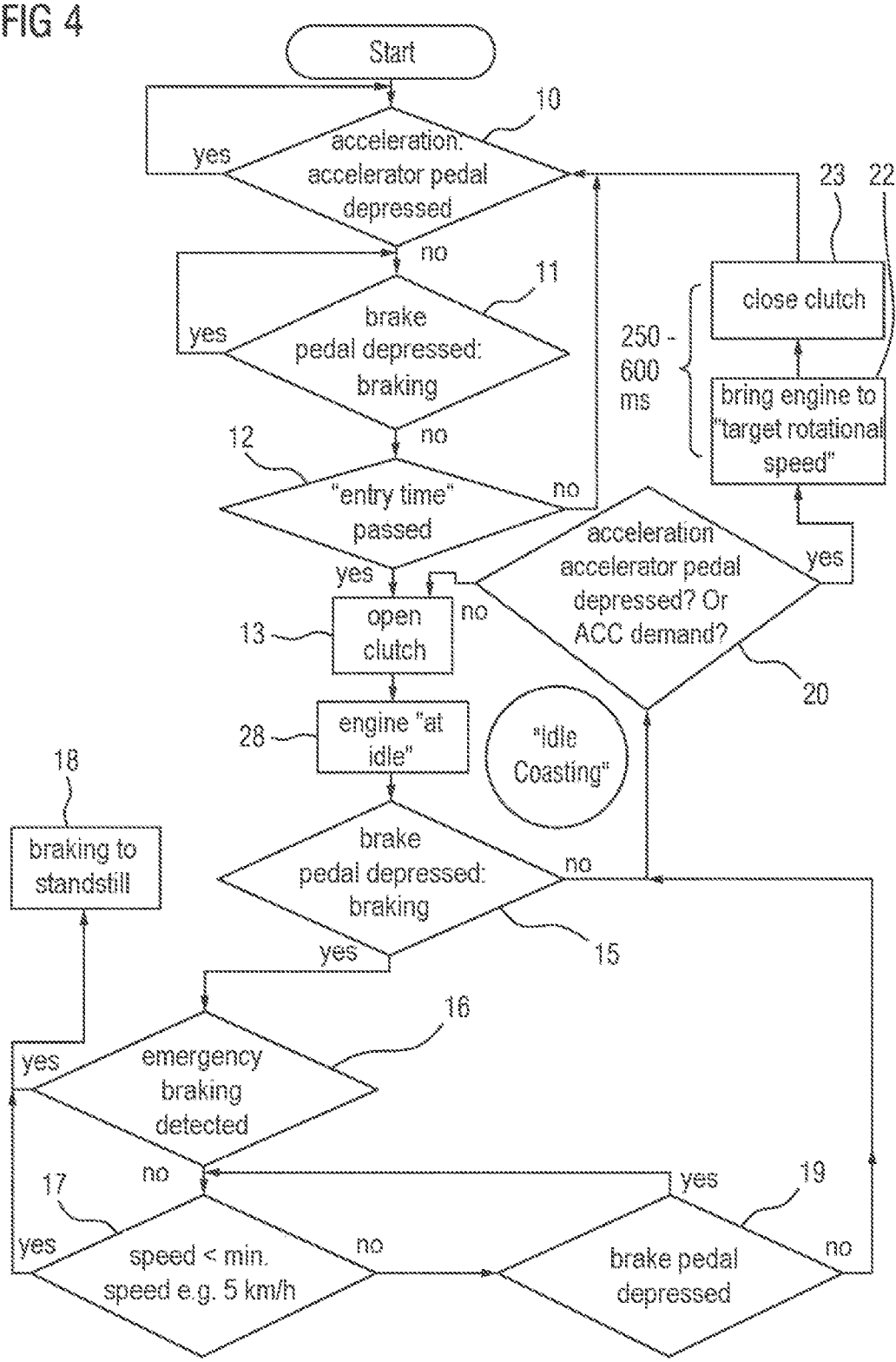
FIG. 4: shows a flow diagram for illustrating the idle coasting operating state.

FIG. 4 shows, for comparison, the operating mode of idle coasting, in which the internal combustion engine is at idle and is disengaged by means of the clutch. The same steps are provided with the same reference designations as in FIG. 2. Here, step 13 "open clutch" is followed by the step 28 "switch internal combustion engine to idle". Here, by contrast to engine-off coasting, the engine is thus not switched off. Now, if, proceeding from the idle coasting in step 20, an acceleration is desired or a power demand is made, for example by the air-conditioning system, the step of engine starting is eliminated, and the internal combustion engine can be brought directly to the target rotational speed in step 22. The process from the power demand to the clutch closing with the target rotational speed usually takes between 250 and 600 ms. In comparison, proceeding from the engine-off coasting according to the prior art shown in FIG. 2, it takes 250 to 1500 ms until the target rotational speed is reached and the clutch can be closed. With the method as shown in FIG. 3, the time for restarting from engine-off coasting can be shortened to approximately 250 to 800 ms.

Figure 5:
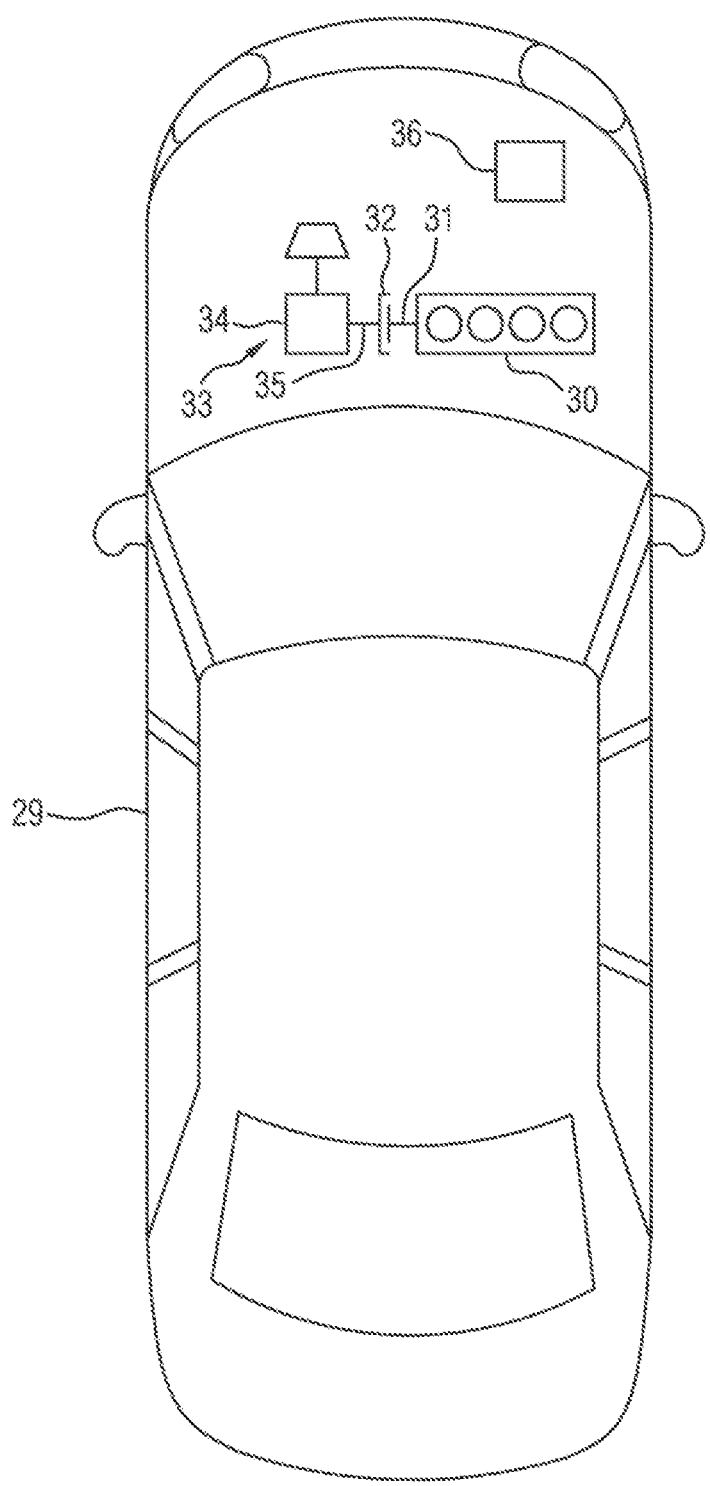
FIG. 5: shows a motor vehicle according to the invention with a control device incorporating the teachings herein.

FIG. 5 shows a motor vehicle 29 incorporating the teachings herein having an internal combustion engine 30 with a crankshaft, which can be separated by means of a releasable clutch 32 from a drivetrain 33 with a transmission 34 and a shaft 35. A control device 36 is configured to carry out a method as taught above in the motor vehicle 29.

The above presentation is merely exemplary. All aspects disclosed in the description and in the claims may be used in the teachings herein both individually and in combination.

What is claimed is:

1. A method for controlling a motor vehicle having an internal combustion engine with a crankshaft and a drivetrain separable from the internal combustion engine using a releasable clutch, the method comprising:
   coasting the vehicle in a first operating state within a predetermined speed range, the first operating state defined by conditions of the internal combustion engine is off and separated from the drivetrain by the releasable clutch;
   sensing a braking operation initiated by a driver while in the first operating state;
   predicting whether a power demand is expected within a predetermined time interval; and
   if the power demand is expected, setting the crankshaft of the internal combustion engine in rotation, or increasing a rotational speed of the crankshaft in preparation for an engine restart.

2. The method for operating a motor vehicle as claimed in claim 1, wherein predicting whether a power demand is expected within the predetermined time interval includes analysing at least one datum selected from the group consisting of: present state data of the drivetrain, driver inputs, information items from vehicle sensors, and route information items.

3. The method for operating a motor vehicle as claimed in claim 1, wherein predicting whether a power demand is expected within the predetermined time interval includes determining no power demand is expected if any predetermined exclusion criterion is present.

4. The method for operating a motor vehicle as claimed in claim 2, wherein, within the predetermined time interval, a power demand is expected if a probability, determined based at least in part on the at least one datum, of a power demand within the predetermined time interval exceeds a predetermined probability threshold.

5. The method for operating a motor vehicle as claimed in claim 1, wherein:
   the clutch comprises a friction clutch; and
   the crankshaft is set in rotation or its rotation speed is increased by at least partially closing the clutch to transmit a torque from the shaft to the crankshaft by means of friction.

6. The method for operating a motor vehicle as claimed in claim 1, wherein the crankshaft of the internal combustion engine is set in rotation, or its rotational speed is increased, using an electric motor.

7. The method for operating a motor vehicle as claimed in claim 1, wherein the motor vehicle comprises an electric motor separable from the drivetrain by using a second releasable clutch.

8. A control device for a motor vehicle, the control device comprising:
   a memory storing instructions; and
   a processor configured to access and execute the instructions stored on the memory;
   wherein the instructions, when executed by the processor, cause the processor to:
   coast the vehicle in a first operating state within a predetermined speed range, the first operating state defined by conditions wherein the internal combustion engine is off and separated from the drivetrain by the releasable clutch;
   sense a braking operation initiated by a driver while in the first operating state;
   predict whether a power demand is expected within a predetermined time interval; and
   if the power demand is expected, set the crankshaft of the internal combustion engine in rotation, or increase a rotational speed of the crankshaft in preparation for an engine restart.

9. The control device for a motor vehicle as claimed in claim 8, further comprising:
   an engine controller for the internal combustion engine; and
   a controller for actuating the clutch.

10. A motor vehicle comprising:
    an internal combustion engine with a crankshaft;
    a drivetrain separable from the internal combustion engine by a releasable clutch; and
    a control device comprising:
    a memory storing instructions; and
    a processor configured to access and execute the instructions stored on the memory;
    wherein the instructions, when executed by the processor, cause the processor to:
    coast the vehicle in a first operating state within a predetermined speed range, the first operating state defined by conditions wherein the internal combustion engine is off and separated from the drivetrain by the releasable clutch;
    sense a braking operation initiated by a driver while in the first operating state;
    predict whether a power demand is expected within a predetermined time interval; and
    if the power demand is expected, set the crankshaft of the internal combustion engine in rotation, or increase a rotational speed of the crankshaft in preparation for an engine restart.

* * * * *